US012183882B2

(12) United States Patent
Lee et al.

(10) Patent No.: US 12,183,882 B2
(45) Date of Patent: Dec. 31, 2024

(54) SOLID ELECTROLYTE MEMBRANE, METHOD FOR MANUFACTURING SAME, AND ALL-SOLID-STATE BATTERY COMPRISING SAME

(71) Applicant: LG CHEM, LTD., Seoul (KR)

(72) Inventors: Jung-Pil Lee, Daejeon (KR); Sung-Joong Kang, Daejeon (KR); Eun-Bee Kim, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 993 days.

(21) Appl. No.: 17/058,394

(22) PCT Filed: Dec. 6, 2019

(86) PCT No.: PCT/KR2019/017212
§ 371 (c)(1),
(2) Date: Nov. 24, 2020

(87) PCT Pub. No.: WO2020/117001
PCT Pub. Date: Jun. 11, 2020

(65) Prior Publication Data
US 2021/0202990 A1 Jul. 1, 2021

(30) Foreign Application Priority Data

Dec. 6, 2018 (KR) .......................... 10-2018-0156424
Dec. 6, 2018 (KR) .......................... 10-2018-0156425
May 3, 2019 (KR) .......................... 10-2019-0052530

(51) Int. Cl.
*H01M 10/05* (2010.01)
*H01M 10/0525* (2010.01)
*H01M 10/0565* (2010.01)

(52) U.S. Cl.
CPC ... *H01M 10/0565* (2013.01); *H01M 10/0525* (2013.01); *H01M 2300/0082* (2013.01); *H01M 2300/0094* (2013.01)

(58) Field of Classification Search
CPC ......... H01M 10/0565; H01M 10/0525; H01M 2300/0082; H01M 2300/0094;
(Continued)

(56) References Cited

U.S. PATENT DOCUMENTS 5,597,659 A * 1/1997 Morigaki ............ H01M 50/491
429/303
2001/0038948 A1 11/2001 Jacobs
(Continued)

FOREIGN PATENT DOCUMENTS

CN 101202128 A 6/2008
CN 107732293 A 2/2018
(Continued)

OTHER PUBLICATIONS

European Search Report for Appl. No. 19892566.1 dated Aug. 2, 2021.
(Continued)

*Primary Examiner* — Michael L Dignan
(74) *Attorney, Agent, or Firm* — Birch, Stewart, Kolasch & Birch, LLP

(57) ABSTRACT

The present disclosure relates to a solid electrolyte membrane including a polymer electrolyte material and a porous polymer sheet which form a composite with each other in such a manner that the pores of the porous polymer sheet filled with the polymer electrolyte material, and a method for manufacturing the same. Since the porous polymer material and the solid electrolyte material form a composite with each other, it is possible to obtain a solid electrolyte membrane having excellent strength and a small thickness of 50
(Continued)

μm or less, and thus to improve the energy density of a battery.

7 Claims, 4 Drawing Sheets

(58) Field of Classification Search
CPC ............. H01M 10/052; H01M 50/403; H01M 50/406; H01M 50/417; H01M 50/44; H01M 50/489; H01M 50/491; H01M 50/494; H01M 50/497; H01M 50/414; H01M 2300/0088; Y02E 60/10
See application file for complete search history.

(56) References Cited

U.S. PATENT DOCUMENTS

| | | | | |
|---|---|---|---|---|
| 2010/0203419 | A1 | 8/2010 | Ishikawa et al. | |
| 2012/0328961 | A1* | 12/2012 | Lee | H01M 6/40 |
| | | | | 429/347 |
| 2015/0244025 | A1* | 8/2015 | Rhee | C08K 3/105 |
| | | | | 429/307 |
| 2015/0280192 | A1* | 10/2015 | Lee | H01M 50/403 |
| | | | | 429/246 |
| 2018/0205057 | A1* | 7/2018 | Sekiguchi | C08L 23/06 |

FOREIGN PATENT DOCUMENTS

| | | |
|---|---|---|
| CN | 107819151 A | 3/2018 |
| CN | 108336401 A | 7/2018 |
| CN | 108767311 A | 11/2018 |
| EP | 2008-277288 A | 11/2008 |
| JP | H 07-220761 | 8/1995 |
| JP | 7-272759 A | 10/1995 |
| JP | 2000-195552 A | 7/2000 |
| JP | 2004-303473 A | 10/2004 |
| JP | 2006-120368 A | 5/2006 |
| JP | 2008-103258 A | 5/2008 |
| JP | 2009-32503 A | 2/2009 |
| JP | 2009-181788 A | 8/2009 |
| JP | 2014-96311 A | 5/2014 |
| JP | 2015-061900 A | 4/2015 |
| JP | 2015-153466 A | 8/2015 |
| JP | 2017-103146 A | 6/2017 |
| JP | 2017-208250 A | 11/2017 |
| KR | 10-2010-0022496 A | 3/2010 |
| KR | 10-2016-0013834 A | 2/2016 |
| KR | 10-2018-0015843 A | 2/2018 |
| WO | 99/54953 A1 | 10/1999 |

OTHER PUBLICATIONS

Fu. K., et al. "Flexible, solid-state, ion-conducting membrane with 3D garnet nanofiber networks for lithium batteries", Proceedings of the National Academy of Sciences, Jun. 28, 2016, vol. 113, No. 26, pp. 7094-7099.
International Search Report for PCT/KR2019/017212 mailed on Mar. 13, 2020.

* cited by examiner

CONVENTIONAL ART

SOLID ELECTROLYTE MEMBRANE, METHOD FOR MANUFACTURING SAME, AND ALL-SOLID-STATE BATTERY COMPRISING SAME

TECHNICAL FIELD

The present disclosure relates to an electrolyte membrane for a solid-state battery, a solid-state battery including the electrolyte membrane and a method for manufacturing the electrolyte membrane.

The present application claims priority to Korean Patent Application No. 10-2018-0156424 filed on Dec. 6, 2018, Korean Patent Application No. 10-2018-0156425 filed on Dec. 6, 2018 and Korean Patent Application No. 10-2019-0052530 filed on May 3, 2019 in the Republic of Korea, the disclosures of which are incorporated herein by reference.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, as a solid electrolyte material, a polymeric solid electrolyte, oxide-based solid electrolyte and a sulfide-based solid electrolyte have been used. Among those, a polymeric solid electrolyte has advantages, including low cost, flexibility of the material, easy processability, safety of a battery and improved energy density derived from thin filming of an electrolyte layer and battery.

However, such a polymeric solid electrolyte material has low strength. Thus, when forming a thin film with a thickness of several tens of microns from the polymeric solid electrolyte material, tearing may occur during the manufacture of an electrolyte membrane or battery. In addition, when applying the polymeric solid electrolyte material as an electrolyte membrane material for a lithium metal battery, the electrolyte membrane may be damaged by lithium dendrite formed from a negative electrode to cause a failure in insulation between the negative electrode and positive electrode. Thus, there is a need for developing a solid electrolyte membrane using a novel composition of polymeric solid electrolyte and a solid-state battery using the same in order to realize excellent electrochemical characteristics of a solid-state battery.

Meanwhile, according to the related art, the polymeric solid electrolyte material has been used in the form of slurry dispersed in a solvent. Since a solid-state battery uses no liquid electrolyte, the pores generated by the evaporation of the solvent can function as resistance.

DISCLOSURE

Technical Problem

The present disclosure is designed to solve the problems of the related art, and therefore the present disclosure is directed to providing a solid electrolyte membrane for a solid-state battery which uses a polymeric solid electrolyte material and has a small thickness and excellent strength, and a solid-state battery including the same.

The present disclosure is also directed to providing a solid electrolyte membrane for a solid-state battery which has improved ion conductivity as compared to the conventional solid electrolyte membranes.

In addition, the present disclosure is directed to providing a method for manufacturing a solid electrolyte membrane having the above-mentioned characteristics and a method for manufacturing a solid-state battery including the solid electrolyte membrane. Meanwhile, these and other objects and advantages of the present disclosure may be understood from the following detailed description. Also, it will be easily understood that the objects and advantages of the present disclosure may be realized by the means shown in the appended claims and combinations thereof.

Technical Solution

In one aspect of the present disclosure, there is provided a solid electrolyte membrane for a solid-state battery according to any one of the following embodiments.

According to the first embodiment of the present disclosure, there is provided a solid electrolyte membrane for a solid-state battery, including a polymer electrolyte material and a porous polymer sheet, wherein the porous polymer sheet is a porous material including a plurality of pores and the pores penetrated through by flowable materials; and the polymer electrolyte material forms a composite with the porous polymer sheet in such a manner that the pores of the porous polymer sheet are filled with the polymer electrolyte material.

According to the second embodiment of the present disclosure, there is provided the solid electrolyte membrane for a solid-state battery as defined in the first embodiment, wherein the polymer electrolyte material is a solid electrolyte film formed by drying a solvent in a polymer resin added to a solvated lithium salt, and shows an ion conductivity of $1 \times 10^{-7}$ S/cm or more.

According to the third embodiment of the present disclosure, there is provided the solid electrolyte membrane for a solid-state battery as defined in the second embodiment, wherein the polymer resin has a weight average molecular weight (Mw) of 5,000-5,000,000.

According to the fourth embodiment of the present disclosure, there is provided the solid electrolyte membrane for a solid-state battery as defined in any one of the first to the third embodiments, wherein the porous polymer sheet is a nonwoven web.

According to the fifth embodiment of the present disclosure, there is provided the solid electrolyte membrane for a solid-state battery as defined in any one of the first to the fourth embodiments, which has a thickness of 15-90 μm and a tensile strength of about 500-2,000 kgf/cm$^2$.

According to the sixth embodiment of the present disclosure, there is provided the solid electrolyte membrane for a solid-state battery as defined in the fifth embodiment, which has a porosity of 15% or less.

According to the seventh embodiment of the present disclosure, there is provided the solid electrolyte membrane for a solid-state battery as defined in any one of the first to the sixth embodiments, wherein the polymer electrolyte material includes at least one selected from polyalkylene carbonate-based polymer resins and polysiloxane-based polymer resins.

According to the eighth embodiment of the present disclosure, there is provided the solid electrolyte membrane for a solid-state battery as defined in any one of the first to the seventh embodiments, wherein the porous polymer sheet is provided with an ion channel including perforated holes, the porous polymer sheet is surface-modified with hydrophilicity, and the polymer electrolyte material is packed in the ion channel of the porous polymer sheet and the pores of the porous polymer sheet so that the polymer electrolyte material may form a composite with the porous polymer sheet.

According to the ninth embodiment of the present disclosure, there is provided the solid electrolyte membrane for a solid-state battery as defined in the eighth embodiment, wherein at least one of the surface, pores and ion channel of the porous polymer sheet is surface-modified with hydrophilicity.

According to the tenth embodiment of the present disclosure, there is provided the solid electrolyte membrane for a solid-state battery as defined in the eighth embodiment, wherein the porous polymer sheet is a polymer film including a polyolefin-based polymer resin, and the polymer film has a thickness of 5-50 μm.

In another aspect of the present disclosure, there is also provided a method for manufacturing a solid electrolyte membrane for a solid-state battery according to any one of the following embodiments.

According to the eleventh embodiment of the present disclosure, there is provided a method for manufacturing a solid electrolyte membrane for a solid-state battery, including the steps of:
(S10) preparing a porous polymer sheet and at least one solid electrolyte film; (S20) disposing the solid electrolyte film on the surface of the porous polymer sheet; and
(S30) carrying out pressurization to press the solid electrolyte film into the pores of the porous polymer sheet, wherein the solid electrolyte film comprises a solid electrolyte material formed by drying a solvent in a polymer resin added to a solvated lithium salt, and shows an ion conductivity of $1 \times 10^{-7}$ S/cm or more.

According to the twelfth embodiment of the present disclosure, there is provided the method for manufacturing a solid electrolyte membrane for a solid-state battery as defined in the eleventh embodiment, wherein the solid electrolyte film is heated before carrying out step (S30), or simultaneously with step (S30).

According to the thirteenth embodiment of the present disclosure, there is provided the method for manufacturing a solid electrolyte membrane for a solid-state battery as defined in the eleventh or the twelfth embodiment, wherein the pressurization in step (S30) is carried out by using at least one pressurization member selected from a roll press, jig and a uniaxial press.

According to the fourteenth embodiment of the present disclosure, there is provided the method for manufacturing a solid electrolyte membrane for a solid-state battery as defined in any one of the eleventh to the thirteenth embodiments, wherein the pressurization member is provided with a heating member.

According to the fifteenth embodiment of the present disclosure, there is provided the method for manufacturing a solid electrolyte membrane for a solid-state battery as defined in any one of the eleventh to the fourteenth embodiments, wherein the polymer resin includes at least one selected from polyalkylene carbonate-based polymer resins and polysiloxane-based polymer resins, and the porous polymer sheet is a nonwoven web.

In still another aspect of the present disclosure, there is provided a method for manufacturing a solid electrolyte membrane for a solid-state battery according to any one of the following embodiments.

According to the sixteenth embodiment of the present disclosure, there is provided a method for manufacturing a solid electrolyte membrane for a solid-state battery, including the steps of:
(T10) preparing a porous polymer sheet;
(T11) forming an ion channel including perforated holes in the thickness direction of the porous polymer sheet;
(T13) carrying out surface-modification of the porous polymer sheet with hydrophilicity;
(T14) disposing a solid electrolyte film on the top surface of the resultant product of step (T13) to obtain a laminate structure; and
(T15) pressurizing the laminate structure so that the ion channel and pores of the porous polymer sheet may be filled with the solid electrolyte film,
wherein the solid electrolyte film comprises a solid electrolyte material formed by adding a polymer resin to a solvated lithium salt, is formed by drying the solvent in the solid electrolyte material, and shows an ion conductivity of $1 \times 10^{-7}$ S/cm or more.

According to the seventeenth embodiment of the present disclosure, there is provided the method for manufacturing a solid electrolyte membrane for a solid-state battery as defined in the sixteenth embodiment, wherein the ion channel has a volume corresponding to 5-90 vol % based on 100 vol % of the total volume of the porous polymer sheet.

According to the eighteenth embodiment of the present disclosure, there is provided the method for manufacturing a solid electrolyte membrane for a solid-state battery as defined in the sixteenth or the seventeenth embodiment, wherein the perforated holes have a diameter of 50 nm to 1 mm.

According to the nineteenth embodiment of the present disclosure, there is provided the method for manufacturing a solid electrolyte membrane for a solid-state battery as defined in any one of the sixteenth to the eighteenth embodiments, wherein the surface-modification is carried out by any one of UV irradiation, plasma, acid treatment and ozone treatment.

Advantageous Effects

The solid electrolyte membrane according to the present disclosure can reduce the manufacturing cost by using a polymeric solid electrolyte, and allows easy deformation so that it may be applied to various types of batteries. In addition, the solid electrolyte membrane according to the present disclosure includes a composite of a porous polymer sheet, such as a nonwoven web, with a solid electrolyte material, and thus can be formed into a thin film having a thickness of 50 μm or less, while providing high strength. Therefore, the solid electrolyte membrane according to the present disclosure is advantageous to improvement of the energy density of a battery.

In addition, since the polymer electrolyte material is used in a form in which the solvent is dried, it is possible to reduce formation of pores that may function as resistance after drying the solvent.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
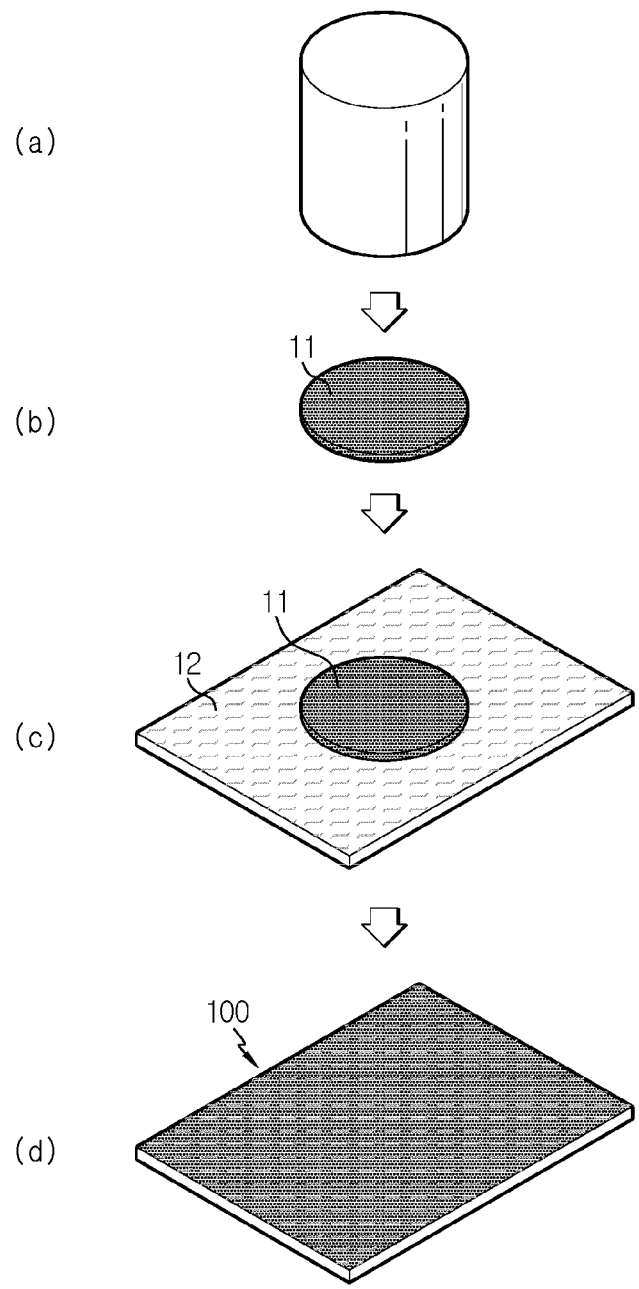
FIG. 1 is a schematic flow chart illustrating the method for manufacturing a solid electrolyte membrane according to the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a solid electrolyte membrane for a solid-state battery and a solid-state battery including the same. The present disclosure also relates to a method for manufacturing the electrolyte membrane. The solid electrolyte membrane for a solid-state battery according to the present disclosure can be formed into a thin film having a thickness of about 100 μm or less, and thus has high ion conductivity and can provide a battery with increased energy density. In addition, the solid electrolyte membrane has high strength despite such a small thickness, and thus is less damaged during its manufacture or during use of a battery.

FIG. 1 is a schematic view illustrating the solid electrolyte membrane according to an embodiment of the present disclosure, and a method for manufacturing the solid electrolyte membrane. Hereinafter, the present disclosure will be described in detail with reference to the accompanying drawings.

The solid electrolyte membrane 100 for a solid-state battery according to the present disclosure includes a polymer electrolyte material 11 and a porous polymer sheet 12 having a plurality of pores, wherein the pores of the polymer sheet are filled with the polymeric solid electrolyte.

In the solid electrolyte membrane, the polymer electrolyte material forms a composite in the porous polymer sheet to cause an increase in mechanical strength. At the same time, the polymer electrolyte material can transport lithium ions, and thus can provide an electrolyte membrane having improved ion conductivity.

The polymer electrolyte material is formed by drying a solvent in a polymer resin added to a solvated lithium salt, is present in the form of a solid electrolyte film in which the solvent is dried, can be handled with ease, and is used in the form of a film in which the solvent is already dried to prevent formation of pores that may function as resistance.

The polymer sheet is a porous material including a plurality of pores and includes a polymer material. According to an embodiment of the present disclosure, the polymer sheet may include a polymer film formed by melting, extruding and orienting a polymer material through a dry process, a polymer film obtained by extracting a plasticizer through a wet process to form pores, a nonwoven web obtained by melting, spinning and compressing a polymer material, a laminate sheet including two or more layers of them, or the like. For example, the polymer sheet may be a nonwoven web.

In the porous polymer sheet, a plurality of pores is formed, wherein the pores are interconnected with one another and penetrate through the substrate from one surface to the other surface so that flowable materials may pass through the pores. Any organic material or inorganic material having electrical insulation property may be used as a material for forming the porous polymer sheet. According to an embodiment of the present disclosure, the polymer sheet may include at least one polymer resin, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

According to an embodiment of the present disclosure, the porous sheet may have a thickness of about 5-90 μm. The thickness may be selected suitably within the above-defined range, considering the thickness and strength of the finished electrolyte membrane. If the thickness of the porous sheet is less than the above-defined range, it is difficult to obtain a desired level of strength of the solid electrolyte membrane. If the sheet has an excessively large thickness, it is difficult to control the thickness to a desired level, even when applying a pressurization process.

In addition, according to an embodiment of the present disclosure, the porous polymer sheet may have a porosity of about 10-90% and the pore size may be controlled suitably within a range of 50 nm to 100 µm. The porosity range and pore size range may be selected suitably within the above-defined ranges in such a manner that the porous polymer sheet may retain the electrolyte film in an amount sufficient to carry out functions as an electrolyte membrane and may not hinder the electrolyte film having low flowability from being pressed into the sheet, while maintaining adequate ion conductivity and mechanical strength. In other words, as porosity is increased, ion conductivity may be improved but mechanical strength may be degraded. In addition, as pore size is increased, press fitting of the electrolyte film is facilitated more.

Meanwhile, according to the present disclosure, the polymeric solid electrolyte is a composite of lithium salt with polymer resin, i.e. a polymer electrolyte material formed by adding a polymer resin to a solvated lithium salt and drying the solvent. The polymeric solid electrolyte may have an ion conductivity of about $1\times10^{-7}$ S/cm or more, preferably about $1\times10^{-5}$ S/cm or more.

According to an embodiment of the present disclosure, the polymer resin may have a weight average molecular weight (Mw) of about 5,000-5,000,000. As molecular weight is reduced, flowability is increased advantageously to a press fitting process.

As described hereinafter, the solid electrolyte membrane according to the present disclosure is obtained by forming a polymer electrolyte into a film shape and pressing the polymer electrolyte film into the porous sheet. When the above-defined conditions are satisfied, it is possible to carry out a press fitting process with ease.

According to an embodiment of the present disclosure, the polymer resin is one satisfying the above-defined conditions and may include a thermoplastic polymer resin. Non-limiting examples of the polymer resin may include a polyether polymer, polycarbonate polymer, acrylate polymer, polysiloxane polymer, phosphazene polymer, polyethylene derivative, alkylene oxide derivative, such as polyethylene oxide, phosphate polymer, polyagitation lysine, polyester sulfide, polyvinyl alcohol, polyvinylidene fluoride, polymer containing an ionically dissociable group, or the like. According to an embodiment of the present disclosure, the solid polymer electrolyte may include, as a polymer resin, a branched copolymer including polyethylene oxide (PEO) backbone copolymerized with a comonomer including an amorphous polymer, such as PMMA, polycarbonate, polysiloxane (pdms) and/or phosphazene, comb-like polymer, crosslinked polymer resin, or the like.

According to an embodiment of the present disclosure, the polymer resin may include at least one selected from polyalkylene carbonate-based polymer resins and polysiloxane-based polymer resins, in combination with or independently from the above-mentioned polymer resin. For example, the polyalkylene carbonate-based resin may include at least one of polyethylene carbonate, polyethylene carbonate copolymer, polypropylene carbonate and polypropylene carbonate copolymer. In terms of ion conductivity and oxidation stability, it is preferred to use polypropylene carbonate (PPC). In addition, according to an embodiment of the present disclosure, the polyalkylene carbonate polymer resin may have a weight average molecular weight (Mw) of about 5,000-1,000,000.

According to an embodiment of the present disclosure, the polymer resin may include polysiloxane-based polymer in combination with or independently from the above-mentioned polymer resin. Polysiloxane-based polymer resin has high ion conductivity but low strength, and thus is hardly used for a solid electrolyte membrane by itself. However, when using polysiloxane-based polymer as a solid electrolyte material according to the present disclosure, it is possible to ensure ion conductivity and mechanical properties at the same time. According to an embodiment of the present disclosure, the polysiloxane-based polymer resin includes a structure represented by [Chemical Formula 1] in the polymer chain, and may be at least one selected from polyalkylsiloxane, polyarylsiloxane, polyorganosiloxane and a copolymer containing at least one of them. Non-limiting examples of the polysiloxane-based polymer resin include polymethylhydrogensiloxane (PMHS) and polydimethyl siloxane (PDMS). In addition, the polysiloxane-based polymer resin may have a weight average molecular weight (Mw) of about 1,000-1,000,000.

[Chemical Formula 1]

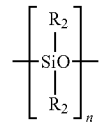

wherein each of $R_1$ and $R_2$ independently represents H or a C1-C30 linear, branched, monocyclic or multicyclic saturated or unsaturated hydrocarbon group containing a heteroatom or not.

According to an embodiment of the present disclosure, in terms of ion conductivity and physical strength, the polymer electrolyte material may include at least one of polyalkylene carbonate-based polymer resins and polysiloxane-based polymer resins in an amount of 80 wt % or more, or 90 wt % or more, based on 100 wt % of the polymer resin.

Meanwhile, according to an embodiment of the present disclosure, the polymer electrolyte material may further include a plasticizer in an amount of 0.1-20 wt % based on 100 wt % of the polymer electrolyte material. The plasticizer can increase the flexibility and flowability of the electrolyte film to facilitate introduction of the electrolyte film into the porous sheet during the press fitting process as described hereinafter. A higher content of plasticizer is advantageous in terms of the manufacturing process of the solid electrolyte membrane. However, in this case, the content of the solid electrolyte material is decreased. Thus, the content of the plasticizer is limited preferably within the above-defined range in terms of strength.

The plasticizer that may be used herein is not particularly limited in terms of its ingredient, and a suitable plasticizer may be selected depending on the particular type of solid electrolyte material to be used. Non-limiting examples of the plasticizer include at least one of ethylene carbonate (EC), propylene carbonate (PC), vinylene carbonate (VC), dioctyl phthalate (DOP), diisodecyl phthalate (DIDP), diisononyl phthalate (DINP), trioctyl trimelitate (TOTM), triisononyl trimelitate (TINTM), or the like. The plasticizer may remain in the solid electrolyte membrane or may be removed by a drying process, after carrying out press fitting.

Meanwhile, the inventors of the present disclosure have found that when the solid electrolyte membrane including a solid electrolyte is formed into a thin film, there is a problem of degradation of mechanical strength. We have also found that since the solid electrolyte membrane functions as an ion channel between a positive electrode and a negative electrode, there still is a need for high ion conductivity.

To solve the above-mentioned problems, according to the present disclosure, there is also provided a solid electrolyte membrane for a solid-state battery having improved mechanical strength and ion conductivity and low resistance by using a porous polymer sheet provided with an ion channel including perforated holes with a predetermined size in the above-described solid electrolyte membrane for a solid-state battery, carrying out surface-modification of the porous polymer sheet with hydrophilicity, and by applying a polymeric solid electrolyte material. The solid electrolyte membrane according to the present disclosure includes a porous polymer sheet forming a composite with a solid electrolyte material, has excellent strength and can be formed into a thin film having a thickness of 50 μm or less, and thus is advantageous to improvement of the energy density of a battery.

Figure 2:
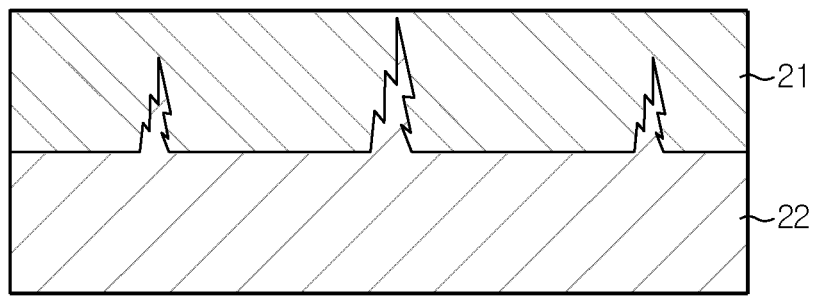
FIG. 2 is a schematic sectional view illustrating the conventional solid electrolyte membrane.
Figure 3:
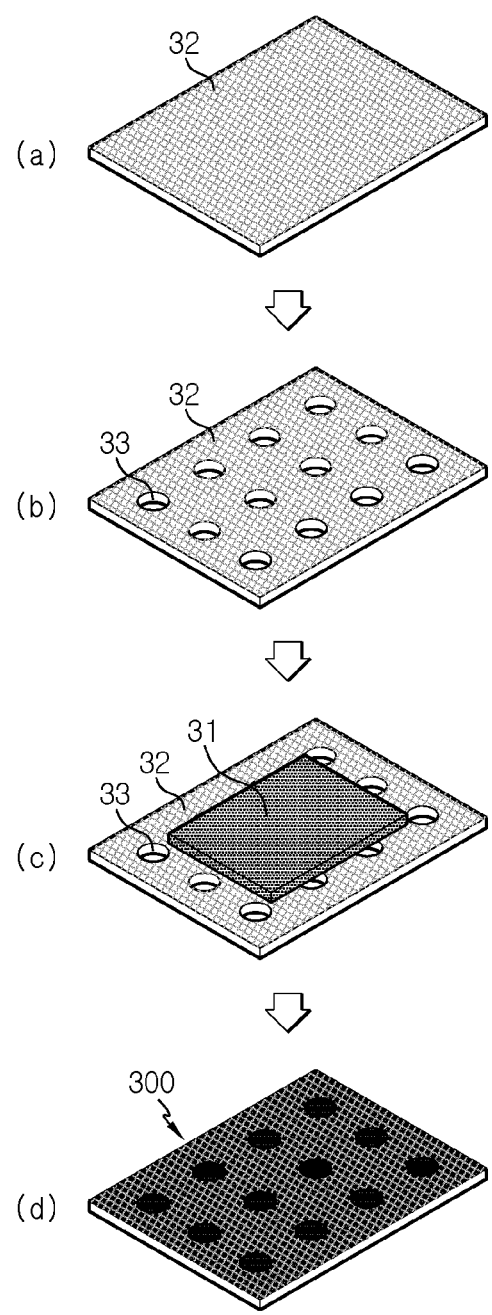
FIG. 3 is a schematic flow chart illustrating the method for manufacturing a solid electrolyte membrane according to an embodiment of the present disclosure.
Figure 4:
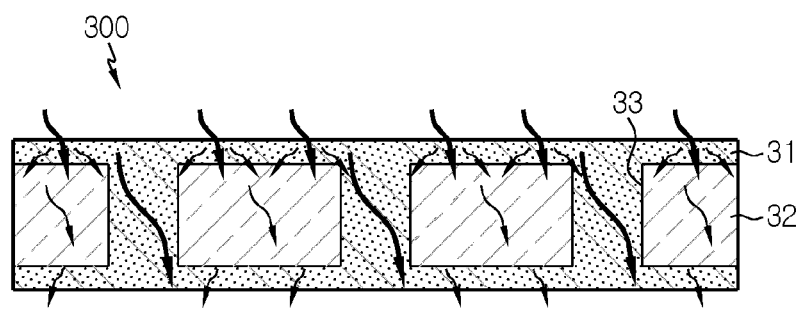
FIG. 4 is a schematic view illustrating the solid electrolyte membrane according to an embodiment of the present disclosure.

FIG. 2 is a schematic sectional view illustrating the conventional solid electrolyte membrane. FIG. 3 is a schematic view illustrating the solid electrolyte membrane according to an embodiment of the present disclosure and the method for manufacturing the solid electrolyte membrane according to an embodiment of the present disclosure. FIG. 4 is a schematic view illustrating the solid electrolyte membrane according to an embodiment of the present disclosure. Hereinafter, the present disclosure will be explained in more detail with reference to the accompanying drawings.

Referring to FIG. 2, when a solid electrolyte membrane 21 is controlled to have a large thickness of about 100 μm in order to increase the mechanical strength of the solid electrolyte membrane, energy density is decreased and processability is also degraded. In addition, even when the thickness is increased, the solid electrolyte membrane itself has low strength, and thus the membrane itself is damaged by lithium dendrite formed from a lithium metal negative electrode 22 to cause a short-circuit undesirably. The inventors of the present disclosure have studied about a method for forming a composite of a porous polymer sheet with a solid electrolyte material to solve the above-mentioned problems.

However, the conventional polymer sheet has a low porosity of 20-50% and a small average pore diameter of 20-500 nm. Thus, it is difficult to press the solid electrolyte material into the polymer sheet. Even when the solid electrolyte material is packed in the polymer sheet, there is a problem of low ion conductivity due to the tortuosity in the porous polymer sheet.

To solve the above-mentioned problem, the solid electrolyte membrane for a solid-state battery according to an embodiment of the present disclosure includes a polymeric solid electrolyte material and a porous polymer sheet having a plurality of pores, wherein the pores of the polymer sheet are filled with the polymeric solid electrolyte material, and particularly, the polymer sheet is provided with an ion channel including perforated holes having a predetermined diameter and is surface-modified with hydrophilicity.

The solid electrolyte membrane according to an embodiment of the present disclosure may have increased mechanical strength by using the porous polymer sheet. In addition, since the polymeric solid electrolyte material is used, it is possible to facilitate incorporation of the solid electrolyte material into the ion channel in the porous polymer sheet and the pores of the porous polymer sheet. Thus, it is possible to reduce dead space and to increase ion conductivity significantly.

In another aspect of the present disclosure, there is provided a solid electrolyte membrane for a solid-state battery, including a polymer electrolyte material and at least one porous polymer sheet, wherein the porous polymer sheet is provided with an ion channel including perforated holes, the porous polymer sheet is surface-modified with hydrophilicity, and the polymer electrolyte material is packed in the ion channel of the porous polymer sheet and the pores of the porous polymer sheet so that the polymer electrolyte material may form a composite with the porous polymer sheet.

The porous polymer sheet is a porous material including a plurality of pores and includes a polymer resin. The porous polymer sheet according to the present disclosure may be provided with an ion channel including perforated holes having a diameter of 50 nm to 1 mm, 100 nm to 700 μm, or 1 μm to 500 μm.

The ion channel may be penetrated through by flowable materials in the thickness direction. Therefore, lithium ions can be transported more smoothly between the positive electrode and the negative electrode of a battery.

Particularly, unlike the conventional porous polymer sheet, the porous polymer sheet according to the present disclosure is provided with an ion channel having a large diameter in the thickness direction, and thus tortuosity of lithium ions is low so that lithium ions may form flow in a specific direction toward the positive electrode or negative electrode. Therefore, lithium ion migration length is minimized and ion conductivity is increased advantageously.

Herein, the perforated hole has a significantly large diameter as compared to the pores in the conventional porous polymer sheet and is not limited to any particular shape. For example, the perforated hole may have a circular shape, ellipsoidal shape or a polygonal shape. The perforated hole may have a circular or ellipsoidal shape with a view to a decrease in dead space upon the press fitting of the polymeric solid electrolyte film.

According to an embodiment of the present disclosure, the perforated holes may be formed at an interval of 0.1-10 mm, 0.5-7 mm, 0.75-5 mm, or 1-2 mm. When the interval between perforated holes is controlled as mentioned above, it is possible to control the volume of the ion channel in the solid electrolyte membrane. Within the above-defined range, it is possible to provide a solid electrolyte membrane having high ion conductivity and controlled mechanical strength.

The ion channel may have a volume corresponding to 5-90 vol %, 10-80 vol %, or 20-60 vol % based on 100 vol % of the total porous polymer sheet. Within the above-defined range, it is possible to provide a solid electrolyte membrane having high ion conductivity and high mechanical strength.

The ion channel may be formed by physical perforation.

According to an embodiment of the present disclosure, the ion channel may have a tortuosity of 1-2.

In other words, according to the present disclosure, it is possible to ensure a pore tortuosity (i.e. straightness) with which lithium ions can be transported smoothly in the solid electrolyte membrane, by virtue of the ion channel.

As used herein, 'tortuosity' is an index indicating how much the ion channel has tortuosity, and can be calculated by dividing the actual migration length of lithium ions in the ion channel by the linear length between the same points. In other words, in the case of a tortuosity of 1, it means an ion channel having a linear lithium ion migration length. As tortuosity is increased to larger than 1, the pores have a large tortuosity.

According to an embodiment of the present disclosure, the ion channel preferably has a tortuosity of 1-2. It is possible to ensure smooth transport of lithium ions within the above-defined range. In other words, the ion channel in the solid electrolyte membrane according to an embodiment of the present disclosure may be formed in a pipe-like shape having little or no tortuosity.

Such an ion channel structure allows smooth transport of lithium ions, resulting in improvement of ion conductivity of the solid electrolyte membrane and a decrease in resistance.

The porous polymer sheet according to the present disclosure is modified with hydrophilicity. Particularly, at least one of the pores, surface and ion channel in the porous polymer sheet may be modified with hydrophilicity. Therefore, the solid electrolyte membrane according to an embodiment of the present disclosure allows the polymeric solid electrolyte material to be incorporated to the pores and ion channel of the porous polymer sheet, and the polymeric solid electrolyte and the porous polymer sheet modified with hydrophilicity can more strongly form a composite physically or chemically.

More particularly, compatibility between the hydrophilic polymeric solid electrolyte material and the hydrophilic porous polymer sheet is increased so that the density of the polymeric solid electrolyte material incorporated to the ion channel or pores may be increased. Therefore, ion conductivity is increased.

According to an embodiment of the present disclosure, the porous polymer sheet may be a polymer film including a polyolefin-based polymer resin.

Herein, the polyolefin-based polymer resin may include any one of polyethylene; polypropylene; polybutylene; polypentene; polyhexene; polyoctene; and copolymers of two or more of ethylene, propylene, butene, pentene, 4-methylpentene, hexene and octene; or two or more of them.

According to an embodiment of the present disclosure, the polyolefin-based polymer resin may be a hydrophilic polymer resin. For example, the polyolefin-based polymer resin may be a hydrophilic polymer resin including polyethylene, polypropylene, polyvinyl alcohol, polylactic acid, poly(allylamine hydrochloride), polyamide, polysilane, polysiloxane, polyimide, polyacetate, or two or more of them. When the hydrophilic polymer resin is used, hydrophilicity is reinforced through the hydrophilic surface treatment as described hereinafter. Thus, it is possible to form a composite with the hydrophilic polymeric solid electrolyte more strongly.

Particularly, the polyolefin-based polymer resin may be surface-modified with hydrophilicity by using polyethylene oxide, polyacrylonitrile, polyacrylic acid, polyacrylate, or two or more of them.

According to an embodiment of the present disclosure, the polymer film may have a thickness of about 5-50 μm. Within the above-defined range, the solid electrolyte membrane realizes not only a desired level of strength but also high energy density.

According to the present disclosure, the polymeric solid electrolyte material is packed in the pores of the porous polymer sheet so that the polymeric solid electrolyte material may form a composite with the porous polymer sheet.

As described hereinafter, the solid electrolyte member is obtained by forming a solid electrolyte containing a solid electrolyte material into a film shape and pressing the film into the porous polymer sheet. Since the solid electrolyte material is press fitted into the porous polymer sheet from such a film shape, it is possible to reduce dead space in the solid electrolyte membrane.

In the electrolyte according to the present disclosure, the lithium salt is an ionizable lithium salt and may be represented by $Li^+X^-$. The anion ($X^-$) of the lithium salt is not particularly limited, but may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_{6P}^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Since the polymer electrolyte is packed in the porous sheet, it is possible to form a solid electrolyte membrane into a thin film without degradation of the strength of the solid electrolyte membrane. According to the present disclosure, the solid electrolyte membrane has a thickness of about 100 μm or less, preferably about 15-90 μm. Within the above-defined range, the solid electrolyte membrane may have a suitable thickness, considering ion conductivity, physical strength, energy density applied to a battery, or the like. For example, in terms of ion conductivity or energy density, the thickness may be 80 μm or less, 70 μm or less, 60 μm or less, or 50 μm or less. Meanwhile, in terms of physical strength, the thickness may be 20 μm or more, 30 μm or more, or 40 μm or more. In addition, the solid electrolyte membrane may have a tensile strength of about 500-2,000 kgf/cm², while it has the above-defined range of thickness. Further, the solid electrolyte membrane may have a porosity of 15% or less, or about 10% or less.

According to an embodiment of the present disclosure, the solid electrolyte membrane may be obtained by forming an electrolyte film by using a polymer electrolyte material, disposing the electrolyte film on the surface of the polymer sheet, and carrying out pressurization so that the electrolyte film may be pressed into the polymer sheet and the pores of the polymer sheet may be filled with the polymer electrolyte.

The method for manufacturing an electrolyte membrane according to the present disclosure will be explained in more detail with reference to FIG. 1. First, an electrolyte film is prepared (S10). The electrolyte film may be prepared as follows. A polymer electrolyte is mixed with a solvent to prepare slurry for forming an electrolyte film (FIG. 1(a)). The solvent may be selected suitably depending on the polymer electrolyte to be used. For example, when an alkylene oxide-based electrolyte, such as polyethylene oxide (PEO), is used as a polymer resin, acetonitrile may be used as a solvent. According to an embodiment of the present disclosure, the slurry may have a solid content of about 5-15 wt %. Herein, it is possible to accelerate homogeneous mixing of the polymer electrolyte with the solvent by increasing the temperature of slurry to 40-60° C.

Next, the slurry is applied to a release sheet, such as a terephthalate film, and is formed into a film shape having a predetermined thickness. The application and shape forming may be carried out by a known coating process, such as doctor blade coating. Then, the slurry is dried to remove the solvent and to obtain an electrolyte film (FIG. 1(b)).

The obtained electrolyte film is disposed on the surface of a porous polymer sheet, such as a nonwoven web, and pressurization is carried out to press the electrolyte film into the sheet (S20) (FIG. 1(c)). Herein, a release film, such as a terephthalate film, may be disposed on the surface of the electrolyte film in order to protect the surface of the electrolyte film and to prevent contamination of the surface of the pressurization member with the electrolyte material. The pressurization may be carried out by using at least one device, such as a roll press, uniaxial press or a jig. Herein, it is possible to provide the electrolyte membrane with a suitable thickness and/or porosity by controlling the processing conditions, such as a press, roller, jig interval, applied pressure and temperature.

According to an embodiment of the present disclosure, the pressurization may be carried out by using a suitable pressurization member selected from known pressurization members, such as a uniaxial press, hot press, roll press and a jig. Herein, the pressurization member may be further provided with a separate heating member so that the surface of the member facing the electrolyte film may be heated. Since the electrolyte film is heated by the pressurization member and thus has increased ductility, it may be pressed into the sheet with ease even under a low-pressure condition.

Meanwhile, according to an embodiment of the present disclosure, the electrolyte film may be warmed to room temperature (25° C.)-180° C. to accelerate introduction of the material into the pores of the polymer sheet by increasing the ductility of the material before it is introduced to the press fitting process after the preparation thereof. Such a warming method is not limited to a specific method. However, the film may be warmed by allowing it to stand in an oven heated to a predetermined temperature for several hours. Herein, it is possible to ensure flowability more easily near the glass transition temperature of the solid electrolyte material. However, addition of a lithium salt may cause a decrease in glass transition temperature.

According to an embodiment of the present disclosure, the porous polymer sheet may be subjected to surface-modification in order to increase the hydrophilicity or hydrophobicity of the surface, before it is introduced to a press fitting process. For example, when PEO is used as an electrolyte film, the porous polymer sheet may be surface-modified with hydrophilicity to increase the affinity with PEO. It is possible to accelerate press fitting of the electrolyte film into the porous sheet and to increase adhesion between the electrolyte film and the porous sheet by increasing the affinity with the electrolyte material. The hydrophilic surface-modification method is not limited to a specific method. For example, the surface-modification method may be selected suitably from known methods, such as UV irradiation, plasma treatment, acid treatment and ozone treatment.

In still another aspect of the present disclosure, there is provided a method for manufacturing a solid electrolyte membrane according to the following embodiments.

Hereinafter, the method for manufacturing a solid electrolyte membrane 300 according to an embodiment will be explained in more detail with reference to FIG. 3.

First, a porous polymer sheet 32 is prepared (T10) (FIG. 3(a)). The porous polymer sheet may be a polymer film including a polyolefin-based polymer resin, and the polymer film may have a thickness of 5-100 μm. In step (T10), the porous polymer sheet may have a low porosity of 20-50% and a small pore diameter of 20-500 nm.

The porous polymer sheet may be a polymer film formed by melting, extruding and orienting a polymer material through a dry process, or a polymer film formed by extracting a plasticizer through a wet process to form pores.

Next, an ion channel including perforated holes 33 having a diameter of 50 nm to 1 mm is formed in the thickness direction of the porous polymer sheet (T11) (FIG. 3(b)).

Particularly, the perforated holes may have a diameter of 50 nm to 1 mm, 100 nm to 700 μm, or 1 μm to 500 μm.

Within the above-defined range, it is possible to provide a solid electrolyte membrane with high ion conductivity and excellent mechanical strength.

Herein, the ion channel including perforated holes may be formed by physical perforation.

For example, a die cutting machine having a perforation pattern of perforated holes having a diameter of 500 μm and an interval between perforated holes of 1.5 mm may be used to form an ion channel having perforated holes in the thickness direction of the porous polymer sheet.

Then, the porous polymer sheet and ion channel are surface-modified with hydrophilicity (T13).

In other words, at least one of the surface, pores and ion channel of the porous polymer sheet is surface-modified. The surface-modification is carried out before the press fitting of the polymeric solid electrolyte material as described hereinafter, and it is possible to increase the hydrophilicity of the surface through the surface-modification. It is possible to accelerate press fitting of the electrolyte film into the porous sheet and to increase adhesion between the electrolyte film and the porous polymer sheet by increasing the affinity of the polymeric solid electrolyte material with the porous polymer sheet.

Herein, the surface-modification method may be carried out by any one method selected from UV (ultraviolet ray) irradiation, plasma treatment, acid treatment and ozone treatment.

According to an embodiment of the present disclosure, the plasma may be argon, nitrogen, oxygen or mixed gas plasma including a mixture of two or more of them. The plasma may be low-temperature or high-temperature plasma, and plasma generated at low temperature may be particularly preferred. It is possible to obtain a surface, pores and an ion channel modified with hydrophilicity by treating the porous polymer sheet with plasma, and thus to carry out strong formation of a composite with the polymeric solid electrolyte material.

Particularly, the polyolefin polymer resin may be hydrophilically surface-modified with plasma using oxygen or ozone. The polyolefin polymer resin surface-modified with hydrophilicity has hydroxyl or carboxyl functional groups, and thus shows hydrophilicity.

According to an embodiment of the present disclosure, UV irradiation may be carried out by exposing the porous polymer sheet to UV with a wavelength of 150-300 nm in the air to increase hydroxyl-, carbonyl- and oxygen-containing compounds and to accomplish surface-modification with hydrophilicity.

Then, a solid electrolyte film 31 including a polymeric solid electrolyte material is disposed on at least one surface of the porous polymer sheet surface-treated with hydrophilicity to obtain a laminate structure (T14) (FIG. 3(c)).

Herein, the solid electrolyte film including a polymeric solid electrolyte material may be prepared as follows. A solid electrolyte material is mixed with a solvent to prepare slurry for forming a solid electrolyte film. The solvent may be selected suitably depending on the solid electrolyte material to be used. For example, when an alkylene oxide-based electrolyte, such as polyethylene oxide, is used as a solid polymer material, acetonitrile may be used as a solvent. According to an embodiment of the present disclosure, the slurry may have a solid content of about 5-15 wt %. Herein, it is possible to accelerate homogeneous mixing of the polymer electrolyte with the solvent by increasing the temperature of slurry to 40-60° C.

Then, the slurry is applied to a release sheet, such as a terephthalate film, and is formed into a film shape having a predetermined thickness. The application and shape forming may be carried out by a known coating process, such as doctor blade coating. Then, the slurry is dried to remove the solvent and to obtain a solid electrolyte film. In the solid electrolyte film, the solvent is already dried. Thus, unlike application and drying of slurry for forming a solid electrolyte on an electrode, formation of pores functioning as resistance is reduced.

The obtained polymeric solid electrolyte film is disposed on at least one surface of the heat-treated porous polymer sheet to obtain a laminate structure.

Finally, the laminate structure of step (T14) is pressurized so that the pores and ion channel of the surface-treated porous polymer sheet may be filled with the polymeric solid electrolyte material to form a composite of the polymeric solid electrolyte material with the porous polymer sheet (T15) (FIG. 3(d)).

The pressurization may be carried out by using a suitable pressurization member selected from known pressurization members, such as a uniaxial press, hot press, roll press and a jig. Herein, it is possible to provide the electrolyte membrane with a suitable thickness and/or porosity by controlling processing parameters, such as the press, roller, jig interval, applied pressure and temperature. Herein, the pressurization member may be further provided with a separate heating member so that the surface of the member facing the electrolyte film may be heated. Since the electrolyte film is heated by the pressurization member and thus has increased ductility, it may be pressed into the sheet with ease even under a low-pressure condition.

Meanwhile, according to an embodiment of the present disclosure, the electrolyte film may be warmed to room temperature (25° C.)-180° C. to accelerate introduction of the material into the pores of the polymer sheet by increasing the ductility of the material before it is introduced to the press fitting process. Such a warming method is not limited to a specific method. However, the film may be warmed by allowing it to stand in an oven heated to a predetermined temperature for several hours.

In still another aspect of the present disclosure, there is provided a solid-state battery including the above-described solid electrolyte membrane. The solid-state battery includes a positive electrode, a negative electrode and a solid electrolyte membrane. According to an embodiment of the present disclosure, the solid electrolyte membrane may include a carbon sheet embedded in the solid electrolyte membrane on at least one surface, wherein the electrolyte membrane may be disposed in such a manner that the carbon sheet may face the positive electrode.

According to the present disclosure, each of the positive electrode and the negative electrode may include a current collector and an electrode active material layer formed on at least one surface of the current collector, wherein the electrode active material layer may include a plurality of electrode active material particles and a solid electrolyte. In addition, the electrode active material layer may further include at least one of a conductive material and a binder resin, if necessary. Additionally, the electrode active material layer may further include various additives in order to supplement or improve the physicochemical properties of the electrode.

According to the present disclosure, in the case of a negative electrode, the electrode active material may be any material used conventionally as a negative electrode active material for a lithium ion secondary battery. For example, the negative electrode active material may include at least one selected from: carbon such as non-graphitizable carbon, graphitic carbon, or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \leq 1$; $1 \leq y \leq 3$; $1 \leq z \leq 8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may include a carbonaceous material and/or Si.

In the case of a positive electrode, the electrode active material may be any material used conventionally as a positive electrode active material for a lithium ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butyrene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, the electrode active material layer may include at least one additive, such as an oxidation stabilizing additive, reduction stabilizing additive, flame retardant, heat stabilizer, anti-fogging agent, or the like, if necessary According to the present disclosure, the solid electrolyte may further include at least one of a polymeric solid electrolyte, oxide-based solid electrolyte and a sulfide-based solid electrolyte.

According to the present disclosure, different solid electrolytes may be used for the positive electrode, negative electrode and the solid electrolyte membrane. In a variant, the same solid electrolyte may be used for at least two battery elements. For example, in the case of a positive electrode, a polymeric solid electrolyte having excellent oxidation stability may be used as a solid electrolyte. In addition, in the case of a negative electrode, a polymeric solid electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ S/cm or more, $10^{-5}$ S/cm or more, may be used with no particular limitation.

According to the present disclosure, the polymeric solid electrolyte may be a solid polymer electrolyte formed by adding a polymer resin to a lithium salt, wherein the polymer resin and lithium salt are solvated independently from each other. In a variant, the polymeric solid electrolyte may be a polymer gel electrolyte formed by impregnating a polymer resin with an organic electrolyte containing an organic solvent and a lithium salt.

According to the present disclosure, the polymeric solid electrolyte may be the same as described above with reference to the solid electrolyte membrane.

The sulfide-based solid electrolyte contains sulfur (S), has conductivity of metal ions that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, or the like.

In addition, the oxide-based solid electrolyte contains oxygen (O), has conductivity of metal ions that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \leq x \leq 1$, $0 \leq y \leq 1$), $LiAl_xZr_{2-x}(PO_4)_3$ (wherein $0 \leq x \leq 1$, $0 \leq y \leq 1$), $LiTi_xZr_{2-x}(PO_4)_3$ (wherein $0 \leq x \leq 1$, $0 \leq y \leq 1$), LISICON compounds, LIPON compounds, perovskite compounds, NASICON compounds and LLZO compounds.

In yet another aspect of the present disclosure, there is provided a secondary battery including the above-described solid electrolyte membrane. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Test Example 1

In Examples 1-7, solid electrolyte membranes for a solid-state battery were obtained, wherein the polymer electrolyte material forms a composite with the porous polymer sheet in such a manner that the pores of the porous polymer sheet are filled with the polymer electrolyte material. Comparative Examples 1-5 are used for comparison with Examples 1-7.

Example 1

Polyethylene oxide (PEO, Mw 600,000) was prepared and mixed with LiTFSI to obtain a polymer electrolyte material. In the polymer electrolyte material, PEO and LiTFSI were mixed at a molar ratio of 9:1. The polymer electrolyte material and acetonitrile were agitated at 60° C. overnight to prepare a polymer solution having a concentration of about 10 wt %. Next, the polymer solution was applied to a terephthalate release film at room temperature by using a doctor blade and dried naturally at room temperature to obtain an electrolyte film having a thickness of about 50 µm.

Then, a nonwoven web substrate (polyethylene terephthalate (PET), thickness 10 µm, porosity 50%) was prepared, and the electrolyte film obtained as described above was disposed on the surface of the substrate to prepare a laminate. The laminate was introduced to a roll press and pressurization was carried out 4 times by reducing the interval between rolls sequentially. In this manner, the electrolyte film was pressed into the nonwoven web substrate. Finally, a solid electrolyte membrane having a thickness of about 30 µm was obtained.

Example 2

A laminate was prepared in the same manner as Example 1. The laminate was heated to 60° C. and introduced to a roll press, and pressurization was carried out twice by reducing the interval between rolls sequentially to obtain a solid electrolyte membrane having a thickness of 30 µm.

Example 3

A laminate was prepared in the same manner as Example 1. The laminate was introduced to a roll press heated to 60° C., and pressurization was carried out once by controlling the interval between rolls to obtain a solid electrolyte membrane having a thickness of 30 µm. The other conditions were the same as Example 1.

Example 4

A laminate was prepared in the same manner as Example 1. The laminate was introduced to a roll press heated to 60° C., and pressurization was carried out once by controlling the interval between rolls to obtain a solid electrolyte membrane having a thickness of 20 μm. The other conditions were the same as Example 1.

Example 5

A laminate was prepared in the same manner as Example 1. The laminate was introduced to a roll press heated to 40° C., and pressurization was carried out twice by reducing the interval between rolls sequentially to obtain a solid electrolyte membrane having a thickness of 20 μm. The other conditions were the same as Example 1.

Example 6

A laminate was prepared in the same manner as Example 1. The laminate was introduced to a uniaxial press heated to 60° C., and pressurization was carried out once to obtain a solid electrolyte membrane having a thickness of 20 μm. The other conditions were the same as Example 1.

Example 7

Two sheets of electrolyte films were prepared in the same manner as Example 1. One sheet of electrolyte film was stacked on each surface of the nonwoven web, and the resultant product was introduced to a uniaxial press heated to 60° C. and pressurization was carried out once to obtain a solid electrolyte membrane having a thickness of 30 μm. The nonwoven web was the same as the nonwoven web used in Example 1.

The processing conditions of Examples are shown in the following Table 1.

TABLE 1

| | Pressurization member | Temperature condition (° C.) | Coating thickness (μm) | Thickness of finished electrolyte membrane (μm) |
|---|---|---|---|---|
| Ex. 1 | Roll press | — | 50 μm | 30 μm |
| Ex. 2 | Roll press | Heat treatment (60° C.) (before pressurization) | 50 μm | 30 μm |
| Ex. 3 | Roll press | 60° C. (heating simultaneously with pressurization) | 50 μm | 30 μm |
| Ex. 4 | Roll press | 60° C. (heating simultaneously with pressurization) | 50 μm | 20 μm |
| Ex. 5 | Roll press | 40° C. (heating simultaneously with pressurization) | 50 μm | 20 μm |
| Ex. 6 | Uniaxial hot press | 60° C. (heating simultaneously with pressurization) | 50 μm | 20 μm |
| Ex. 7 | Uniaxial hot press | 60° C. (heating simultaneously with pressurization) | 50 μm | 30 μm |

Comparative Example 1

Polyethylene oxide (PEO, Mw 600,000) was prepared and mixed with LiTFSI to obtain a polymer electrolyte material. In the polymer electrolyte material, PEO and LiTFSI were mixed at a molar ratio of 9:1. The polymer electrolyte material and acetonitrile were agitated at 60° C. overnight to prepare a polymer solution having a concentration of about 10 wt %. Next, the polymer solution was applied to a terephthalate release film at room temperature by using a doctor blade and dried naturally at room temperature to obtain an electrolyte film having a thickness of about 50 μm.

Comparative Example 2

An electrolyte film was obtained in the same manner as Comparative Example 1, except that the solid electrolyte film had a thickness of 30 μm.

Comparative Example 3

An electrolyte film having a thickness of 50 μm was obtained in the same manner as Comparative Example 1. Then, the electrolyte film was introduced to a roll press at 60° C. and pressurization was carried out once so that the electrolyte film might have a thickness of 30 μm.

Comparative Example 4

A polymer solution was prepared in the same manner as Comparative Example 1. The polymer solution was applied onto a nonwoven web by using a doctor blade and dried to obtain a solid electrolyte membrane having a thickness of about 50 μm.

Comparative Example 5

The solid electrolyte membrane obtained from Comparative Example 4 was introduced to a roll press heated to 60° C. and pressurization was carried out once to obtain a solid electrolyte membrane having a thickness of about 30 μm.

Determination of Porosity

Each of the solid electrolyte membranes according to Examples and Comparative Examples was cut into a size of 1.7671 cm² and the weight and volume of each solid electrolyte membrane were measured (apparent density was determined), and the apparent density was compared with a designed value (true density) to calculate porosity. In other words, the true density of each solid electrolyte membrane was calculated from the compositional ratio of the ingredients contained in each solid electrolyte membrane and the density of each ingredient, and then porosity was calculated from the difference between the apparent density and the true density.

Determination of Ion Resistance

Each of the solid electrolyte membranes according to Examples and Comparative Examples was cut into a size of 1.7671 cm². Then, the solid electrolyte membrane was interposed between two sheets of stainless steel (SUS) to obtain a coin cell. The electrochemical impedance of the coin cell was determined by using an impedance analyzer (VMP3, Bio logic science instrument) at 60° C. under the conditions of an amplitude of 10 mV and a scan range from 500 kHz to 0.1 mHz.

Tensile Strength

Each of the solid electrolyte membranes according to Examples and Comparative Examples was cut into a size of 15 mm×50 mm. To minimize damages of the solid electrolyte membrane caused by tweezers, a tape was adhered to both ends of each sample, and tensile strength was determined by using a UTM device.

Discharge Capacity

First, NCM811 ($LiNi_{0.8}Co_{0.1}Mn_{0.1}O_2$) as a positive electrode active material, vapor grown carbon fibers (VGCF) as a conductive material, and a polymeric solid electrolyte (mixture of PEO with LiTFSI ($CF_3SO_2NLiSO_2CF_3$), molar ratio of PEO:LiTFSI=9:1) were mixed at a weight ratio of 80:3:17, and the resultant mixture was introduced to acetonitrile, followed by agitation, to provide electrode slurry. An aluminum current collector having a thickness of 20 μm was prepared. The electrode slurry was applied by using a doctor blade to the current collector and the resultant product was vacuum-dried at 120° C. for 4 hours. Then, pressing was carried out by using a roll press to obtain an electrode (positive electrode) having an electrode loading amount 3 $mAh/cm^2$, an electrode active material layer thickness of 86 μm and a porosity of 16%. Then, the electrode was cut into a circular shape having an area of 1.4875 $cm^2$. In addition, a negative electrode cut into a circular shape having an area of 1.7671 $cm^2$ was prepared. The negative electrode includes lithium metal having a thickness of 40 μm, bound to the surface of a current collector made of copper and having a thickness of 10 μm.

Each of the solid electrolyte membrane obtained from Examples 4 and 7 and Comparative Examples 1 and 5 was cut into a size of 1.7671 $cm^2$ and interposed between the positive electrode and the negative electrode to obtain a battery. The battery was subjected to charge/discharge at about 60° C. to evaluate the initial discharge capacity.

Charge condition: constant current (CC)/constant voltage (CV), (4.0V, 0.005 C current cut-off)

Discharge condition: constant current (CC) 3V

After the evaluation, Example 4 and Example 7 provide a high discharge capacity of 130 mAh/g and 133 mAh/g, respectively. On the contrary, Comparative Examples 1 and 5 provides a discharge capacity of 126 mAh/g and 124 mAh/g, respectively, which are lower as compared to Examples 4 and 7.

TABLE 2

| Examples | Porosity (%) | Ion resistance (ohm) | Tensile strength (kgf/cm$^2$) |
| --- | --- | --- | --- |
| 1 | 9 | 24 | 688 |
| 2 | 9 | 24 | 712 |
| 3 | 7 | 22 | 695 |
| 4 | 7 | 15 | 732 |
| 5 | 8 | 16 | 744 |
| 6 | 7 | 16 | 735 |
| 7 | 7 | 20 | 698 |

TABLE 3

| Comparative Examples | Porosity (%) | Ion resistance (ohm) | Tensile strength (kgf/cm$^2$) |
| --- | --- | --- | --- |
| 1 | 13 | 25 | 407 |
| 2 | 15 | 19 | 388 |
| 3 | 10 | 18 | 393 |
| 4 | 18 | 45 | 607 |
| 5 | 15 | 26 | 650 |

As can be seen from Table 2 and Table 3, in the case of the electrolyte membranes using press fitting of an electrolyte film according to Examples, they show excellent tensile strength, while they are formed into thin films having a thickness of 20 μm or 30 μm, as compared to the electrolyte membranes according to Comparative Examples. In addition, the electrolyte membranes according to Examples have a low porosity and a small thickness, and thus show excellent ion resistance characteristics. Meanwhile, the electrolyte membranes according to Comparative Examples 2 and 3 show lower ion resistance characteristics, but have a larger thickness, higher porosity and lower strength, as compared to Examples. Meanwhile, in the batteries using the electrolyte membranes according to Examples and Comparative Examples, the batteries using the electrolyte membranes according to Examples show higher discharge capacity as compared to the batteries using the electrolyte membranes according to Comparative Examples.

As can be seen from the above test results, use of a porous substrate can significantly improve the strength of a solid electrolyte membrane. Thus, when the release film is removed or the solid electrolyte membrane is cut into a desired size, processability is improved, and particularly, deformation (damage) of the solid electrolyte membrane is reduced and short-circuit generation is also reduced, resulting in an increase in yield. On the contrary, when the porous substate is added, ion conductivity may be degraded due to tortuosity. However, it is possible to maintain ion resistance at an adequate level by forming the solid electrolyte membrane to have a small thickness. Therefore, it is possible to improve the discharge capacity of a positive electrode. In addition, since the solid electrolyte membrane has a small thickness, it is possible to significantly improve the energy density of a battery. In addition, in the case of a conventional solid electrolyte membrane obtained by impregnating a porous substrate with a polymer solution, a large amount of pores may remain in the solid electrolyte membrane obtained as a product of formation of a composite between a solid electrolyte and a porous substrate, due to a difference in compatibility of the polymer solution and the porous substate and evaporation of the solvent during a drying step. On the contrary, since the solid electrolyte membrane according to the present disclosure is obtained by pressing a solid electrolyte film into a porous substrate, it is possible to significantly reduce the porosity of the solid electrolyte membrane and to improve ion resistance. Further, it is possible to increase the flowability of the electrolyte film through the heat treatment before press fitting or through heating during press fitting work, and thus to reduce the number of processing times and to make the solid electrolyte membrane have a uniform surface state. Additionally, after pressing a film into a porous substrate through various methods according to Examples 1-7, all the methods can provide excellent electrochemical characteristics as compared to Comparative Examples. In other words, it can be seen that when the electrolyte film is pressed into the porous substrate, it is possible to improve the surface of the solid electrolyte membrane and thus to reduce ion resistance, regardless of any particular individual step or method.

Test Example 2

In Examples 8-11, at least one selected from polyalkylene carbonate-based polymer resins and polysiloxane-based polymer resins is used as a polymer electrolyte material. Comparative Examples 1-5 are used for comparison with Examples 8-11.

Example 8

Polyethylene oxide (PEO, Mw 600,000) was prepared and mixed with LiTFSI to obtain a polymer electrolyte material. In the polymer electrolyte material, PEO and LiTFSI were mixed at a molar ratio of 9:1. The polymer electrolyte material and acetonitrile were agitated at 60° C. overnight to prepare a polymer solution having a concentration of about 10 wt %. Next, the polymer solution was applied to a terephthalate release film at room temperature by using a doctor blade and dried naturally at room temperature to obtain an electrolyte film having a thickness of about 50 µm.

Then, a nonwoven web substrate (polyethylene terephthalate (PET), thickness 10 µm, porosity 50%) was prepared, and the electrolyte film obtained as described above was disposed on the surface of the substrate to prepare a laminate. The laminate was heated to 60° C., introduced to a roll press and pressurization was carried out so that the electrolyte film might be pressed into the nonwoven web substrate. Finally, a solid electrolyte membrane having a thickness of about 20 µm was obtained.

Example 9

A solid electrolyte membrane having a thickness of 2 µm was obtained in the same manner as Example 8, except that a mixture of polymethylhydrosiloxane (PMHS) with LiTFSI (LiTFSI 30 wt %) was used as a polymer electrolyte material.

Example 10

A solid electrolyte membrane having a thickness of 20 µm was obtained in the same manner as Example 8, except that a mixture of PEO, polymethylhydrosiloxane (PMHS) and LiTFSI was used as a polymer electrolyte material. In the mixture, the content of LiTFSI was 30 wt % based on 100 wt % of the polymer electrolyte material. In addition, PEO and polymethylhydrosiloxane (PMHS) were used at a weight ratio of 1:1.

Example 11

A solid electrolyte membrane having a thickness of 20 µm was obtained in the same manner as Example 8, except that a mixture of PEO, polypropylene carbonate (PPC) and LiTFSI (molar ratio of PPC:Li=20:1) was used as a polymer electrolyte material. Herein, PEO and PPC were used at a weight ratio of 1:1.

TABLE 4

|  | Porosity (%) | Ion resistance (ohm) | Tensile strength (kgf/cm$^2$) |
|---|---|---|---|
| Example 8 | 7 | 15 | 695 |
| Example 9 | 7 | 15 | 732 |
| Example 10 | 5 | 12 | 699 |
| Example 11 | 6 | 13 | 714 |

As can be seen from the above test results, use of a porous substrate can significantly improve the strength of a solid electrolyte membrane, resulting in improvement of processability and an increase in yield. On the contrary, when the porous substate is added, ion conductivity may be degraded due to tortuosity. However, it is possible to obtain the solid electrolyte membrane having a small thickness, and thus the solid electrolyte membrane shows excellent ion resistance characteristics. Therefore, it is possible to improve the discharge capacity of a positive electrode. In addition, since the solid electrolyte membrane has a small thickness, it is possible to significantly improve the energy density of a battery. In addition, in the case of a conventional solid electrolyte membrane obtained by impregnating a porous substrate with a polymer solution, pores may be developed well in the solid electrolyte membrane due to a difference in compatibility with the porous substrate and evaporation of the solvent during a drying step. Since the solid electrolyte membrane is incorporated to the porous substrate according to the present disclosure, it is possible to significantly reduce porosity and to improve ion resistance, as compared to the conventional solid electrolyte membrane. In addition, it can be seen that it is possible to reduce the ion resistance of the solid electrolyte membrane regardless of solid electrolyte materials.

Evaluation of Initial Discharge Capacity and Continuous Charge

Manufacture of Battery (1)

Each of Examples 9-11 and Comparative Example 1 was evaluated in terms of performance in a battery as follows. First, NCM811 (LiNi$_{0.8}$Co$_{0.1}$Mn$_{0.1}$O$_2$) as a positive electrode active material, vapor grown carbon fibers (VGCF) as a conductive material, and a polymeric solid electrolyte (mixture of PEO with LiTFSI (CF$_3$SO$_2$NLiSO$_2$CF$_3$), molar ratio of PEO:LiTFSI=9:1) were mixed at a weight ratio of 80:3:17, and the resultant mixture was introduced to acetonitrile, followed by agitation, to provide electrode slurry. An aluminum current collector having a thickness of 20 µm was prepared. The electrode slurry was applied to the current collector by a doctor blade and the resultant product was vacuum-dried at 120° C. for 4 hours. Then, pressing was carried out by using a roll press to obtain an electrode (positive electrode) having an electrode loading amount 3 mAh/cm$^2$, an electrode active material layer thickness of 86 µm and a porosity of 16%. Then, the electrode was cut into a circular shape having an area of 1.4875 cm$^2$. In addition, a negative electrode cut into a circular shape having an area of 1.7671 cm$^2$ was also prepared. The negative electrode includes lithium metal having a thickness of 40 µm, bound to the surface of a current collector made of copper and having a thickness of 10 µm. Each of the solid electrolyte membranes obtained from Examples 9-11 and Comparative Example 6 was cut into a size of 1.7671 cm$^2$ and interposed between the positive electrode and the negative electrode to obtain a battery.

Each of the batteries obtained from Manufacture of Battery (1) was subjected to charge/discharge at about 60° C. to evaluate the initial discharge capacity.

Charge condition: constant current (CC)/constant voltage (CV), (4.0V, 0.005 C current cut-off)

Discharge condition: constant current (CC) 3V (0.05 C)

Meanwhile, each of the batteries according to Examples 9 to 11 and Comparative Example 1 was charged continuously to test the side reaction time in the electrode. The test was carried out by carrying out charge at 60° C. in a CC mode to 4.205V at 0.05 C, and then applying electric current continuously under a CV condition. In each battery, current enhancing time caused by side reactions in the battery was determined. The results are shown in Table 5.

TABLE 5

|  | Discharge capacity (mAh/g, 4.0 V) | Current enhancing time (Continuous charge, 4.25 V) |
|---|---|---|
| Example 9 | 130 | 90 |
| Example 10 | 137 | — |
| Example 11 | 135 | — |
| Comp. Ex. 1 | 126 | 89 |

As can be seen from Tables 3 and 4, the electrolyte membranes using press fitting of an electrolyte film according to Examples show high physical strength, such as tensile strength, and allow formation into thin films. In addition, it can be seen that the electrolyte membranes according to Examples have a low porosity and small thickness to provide excellent ion resistance characteristics, resulting in improvement of discharge capacity. Particularly, a polysiloxane-based electrolyte has high ion conductivity but low mechanical strength undesirably. However, such a polysiloxane-based electrolyte has improved applicability to batteries through the method according to the present disclosure. Meanwhile, it is possible to increase current enhancing time by using a polycarbonate-based polymer known to have high oxidation stability, and thus to improve stabilization of a battery.

Test Example 3

In Examples 12-16, a porous polymer sheet provided with an ion channel including perforated holes is used and the porous polymer sheet is surface-modified with hydrophilicity. Comparative Examples 6-10 are used for comparison with Examples 12-16.

Example 12

A polyethylene porous polymer sheet (porosity 37%, pore diameter 43 nm) having a thickness of 6.8 μm was prepared.

Next, an ion channel including perforated holes having a diameter of 500 μm was formed in the porous polymer sheet in the thickness direction thereof by using a die cutting machine. Herein, the perforated holes have an interval of 1 mm.

Then, the porous polymer sheet was treated with $O_2$ plasma (SPI Plasma Prep II, 50 watts). Particularly, $O_2$ plasma was allowed to flow at a flow rate of 100 sccm for 1 minute. In this manner, the surface, pores and ion channel of the porous polymer sheet were modified with hydrophilicity.

Meanwhile, polyethylene oxide (PEO, Mw 600,000) was prepared and mixed with LiTFSI to obtain a polymer electrolyte material. In the polymer electrolyte material, PEO and LiTFSI were mixed at a molar ratio of 9:1. The polymer electrolyte material and acetonitrile were agitated at 60° C. overnight to prepare a polymer solution having a concentration of about 10 wt %. Next, the polymer solution was applied to a terephthalate release film at room temperature by using a doctor blade and dried naturally at room temperature to obtain a solid electrolyte film having a thickness of about 50 μm.

Then, the electrolyte film prepared as described above was disposed on one surface of the surface-treated porous polymer sheet to obtain a laminate structure. The laminate structure was introduced to a roll press and pressurization was carried out 4 times by reducing the interval between rolls sequentially. In this manner, the polymeric electrolyte film was pressed into the pores of the surface-treated porous polymer sheet. Finally, a solid electrolyte membrane for a solid-state battery having a thickness of about 50 μm was obtained.

Example 13

A solid electrolyte membrane was obtained in the same manner as Example 12, except that the preformatted holes had an interval of 0.75 mm.

Example 14

A polyethylene porous polymer sheet (porosity 37%, pore diameter 43 nm) having a thickness of 6.8 μm was prepared.

Next, an ion channel including perforated holes having a diameter of 500 μm was formed in the porous polymer sheet in the thickness direction thereof by using a die cutting machine. Herein, the perforated holes have an interval of 1 mm.

Then, the porous polymer sheet was surface-modified with hydrophilicity through spin coating using polyethylene glycol (PEG, Sigma-Aldrich Co., weight average molecular weight 400).

A solid electrolyte membrane was obtained in the same manner as Example 13, except that the surface-treated porous polymer sheet obtained as described above was used.

Example 15

After preparing the same porous polymer sheet as Example 13, a polymeric solid electrolyte film was pressed into the porous polymer sheet to obtain a solid electrolyte membrane having a thickness of 20 μm.

Example 16

A solid electrolyte membrane was obtained in the same manner as Example 12, except that a polymeric solid electrolyte solution was used instead of the polymeric solid electrolyte film.

The processing conditions of Examples and test data thereof are shown in Table 6.

Comparative Example 6

A solid electrolyte membrane was obtained in the same manner as Example 12, except that the ion channel was not formed in the porous polymer sheet and the hydrophilic surface-treatment was not carried out.

Comparative Example 7

A solid electrolyte membrane was obtained in the same manner as Example 12, except that the ion channel was formed in the porous polymer sheet but the porous polymer sheet was not subjected to hydrophilic surface-treatment.

Comparative Example 8

A solid electrolyte membrane was obtained in the same manner as Example 12, except that the ion channel was not formed in the porous polymer sheet but the porous polymer sheet was subjected to hydrophilic surface-treatment.

Comparative Example 9

A polyethylene porous polymer sheet (porosity 37%, pore diameter 43 nm) having a thickness of 6.8 μm was prepared. Next, an ion channel including perforated holes having a diameter of 500 μm was formed in the porous polymer sheet in the thickness direction thereof by using a die cutting machine. Herein, the perforated holes have an interval of 0.75 mm. The porous polymer sheet was not subjected to hydrophilic surface treatment.

Next, an oxide-based solid electrolyte slurry was obtained as follows. Particularly, LAGP, PEO and LiTFSI were introduced to acetonitrile (AN) at a weight ratio of 75:18:7 to obtain slurry having a solid content of 40 wt %.

Then, the non-surface treated porous polymer sheet was impregnated with the oxide-based solid electrolyte slurry to obtain a solid electrolyte membrane having a thickness of 90 μm.

Comparative Example 10

A polyethylene porous polymer sheet (porosity 37%, pore diameter 43 nm) having a thickness of 6.8 μm was prepared.

Next, an ion channel including perforated holes having a diameter of 500 μm was formed in the porous polymer sheet in the thickness direction thereof by using a die cutting machine. Herein, the perforated holes have an interval of 0.75 mm.

Next, the porous polymer sheet was treated with $O_2$ plasma (SPI Plasma Prep II, 50 watts). Particularly, $O_2$ plasma was allowed to flow at a flow rate of 100 sccm for 1 minute. In this manner, the surface, pores and ion channel of the porous polymer sheet were modified with hydrophilicity.

After that, an oxide-based solid electrolyte slurry was obtained as follows. Particularly, LAGP, PEO and LiTFSI were introduced to xylene at a weight ratio of 75:18:7 to obtain slurry having a solid content of 40 wt %.

Then, the surface-treated porous polymer sheet was impregnated with the oxide-based solid electrolyte slurry to obtain a solid electrolyte membrane having a thickness of 90 μm.

Test Methods
Determination of Porosity
Porosity was determined in the same manner as described above.
Determination of Air Permeability
An air permeability tester was used to determine the time required for 100 mL of air to pass through a solid electrolyte membrane.
Tensile Strength
Tensile strength was determined in the same manner as described above.
Determination of Thickness
The thickness of each of the solid electrolyte membranes according to Examples and Comparative Examples was determined by using a thickness analyzer available from Mouser Co.
Determination of Ion Resistance
Ion resistance was determined in the same manner as described above.
Determination of Discharge Capacity
Discharge capacity was determined in the same manner as described above.

TABLE 6

| | Diameter of perforated holes (mm) | Interval of perforated holes (mm) | Porosity of solid electrolyte membrane (%) | Air permeability of solid electrolyte membranes/ 100 mL) | Tensile strength of solid electrolyte membrane (kgf/cm$^2$) | Thickness of solid electrolyte membrane (μm) | Ion resistance of solid electrolyte membrane (ohm) | Discharge capacity of solid-state battery (mAh/g @4.0 V) |
|---|---|---|---|---|---|---|---|---|
| Ex. 12 | 0.5 | 1 | 50 | 27 | 1320 | 50 | 37 | — |
| Ex 13 | 0.5 | 0.75 | 59 | 19 | 1231 | 50 | 29 | — |
| Ex. 14 | 0.5 | 0.75 | 53 | 22 | 1243 | 50 | 31 | — |
| Ex. 15 | 0.5 | 0.75 | 59 | 19 | 1231 | 20 | 16 | 132 |
| Comp Ex. 6 | — | — | 37 | 165 | 1500 | 50 | 45 | 112 |
| Comp Ex. 7 | 0.5 | 0.75 | 59 | 20 | 1242 | 50 | 37 | — |
| Comp Ex. 8 | — | — | 37 | 159 | 1482 | 50 | 41 | — |
| Comp Ex. 9 | 0.5 | 0.75 | 59 | 19 | 1231 | 90 | 286 | — |
| Comp Ex. 10 | 0.5 | 0.75 | 59 | 19 | 1231 | 90 | 291 | 73 |

As shown in Table 6, when perforated holes are further introduced to a porous polymer sheet, porosity of a solid electrolyte membrane is increased. By virtue of the added pores, the solid electrolyte membrane shows improved air permeability. In addition, since the solid electrolyte material is incorporated to the pores and ion channel of the solid electrolyte membrane, ion resistance is reduced. Further, when the porous polymer sheet is treated with hydrophilicity, compatibility between the porous polymer sheet and the polymeric solid electrolyte material is increased, resulting in a further decrease in ion resistance.

On the contrary, as can be seen from Comparative Examples 9 and 10, when the porous polymer sheet is impregnated with the oxide-based solid electrolyte material which is an inorganic solid electrolyte material, incorporation of the polymeric solid electrolyte material is limited and formation of a thin film is difficult.

DESCRIPTION OF DRAWING NUMERALS

100: Solid electrolyte membrane for solid-state battery
11: Polymer electrolyte material
12: Porous polymer sheet
21: Conventional solid electrolyte membrane
22: Lithium metal negative electrode
300: Solid electrolyte membrane for solid-state battery
31: Solid electrolyte film
32: Porous polymer sheet
33: Perforated hole

What is claimed is:

1. A solid electrolyte membrane for a solid-state battery, comprising:
    a polymer electrolyte material; and
    a hydrophilic surface-modified porous polymer sheet,
    wherein the hydrophilic surface-modified porous polymer sheet comprises a porous material having a plurality of pores wherein the pores are configured to be penetrated by flowable materials,
    the polymer electrolyte material forms a composite with the hydrophilic surface-modified porous polymer sheet, wherein the pores of the hydrophilic surface-modified porous polymer sheet are filled with the polymer electrolyte material,
    wherein the hydrophilic surface-modified porous polymer sheet further comprises an ion channel comprising perforated holes,
    further wherein the polymer electrolyte material is packed in the ion channel of the hydrophilic surface-modified porous polymer sheet and the pores of the hydrophilic surface-modified porous polymer sheet,
    wherein the perforated holes have a diameter of 1-500 μm,
    wherein the polymer electrolyte material comprises a solid electrolyte film, wherein the solid electrolyte film is formed by drying a solvent in a composition comprising a polymer resin added to a solvated lithium salt,
    wherein the hydrophilic surface-modified porous polymer sheet has an upper surface,
    wherein the solid electrolyte membrane is manufactured by disposing the solid electrolyte film on the upper surface of the hydrophilic surface-modified porous polymer sheet and pressurizing it to fill the ion channels and pores of the hydrophilic surface-modified porous polymer sheet with the solid electrolyte film,
    wherein the pressurization is carried out by a pressurization member, and the temperature of the pressurization member is 40° C. to 60° C.,
    wherein the solid electrolyte film shows an ion conductivity of $1 \times 10^{-7}$ S/cm or more, and wherein the solid electrolyte membrane for a solid-state battery has a tensile strength of about 500 kgf/cm$^2$ to 2,000 kgf/cm$^2$.

2. The solid electrolyte membrane for a solid-state battery according to claim 1, wherein the polymer resin has a weight average molecular weight (Mw) of 5,000-5,000,000.

3. The solid electrolyte membrane for a solid-state battery according to claim 1, wherein the hydrophilic surface-modified porous polymer sheet is a nonwoven web.

4. The solid electrolyte membrane for a solid-state battery according to claim 1, which has a thickness of 15 μm to 90 μm.

5. The solid electrolyte membrane for a solid-state battery according to claim 1, which has a porosity of 15% or less.

6. The solid electrolyte membrane for a solid-state battery according to claim 1, wherein the polymer electrolyte material comprises at least one selected from the group consisting of polyalkylene carbonate-based polymer resins and polysiloxane-based polymer resins.

7. The solid electrolyte membrane for a solid-state battery according to claim 1, wherein the hydrophilic surface-modified porous polymer sheet is a polymer film comprising a polyolefin-based polymer resin, and the polymer film has a thickness of 5 μm to 50 μm.

* * * * *